United States Patent [19]

Thomas et al.

[11] 3,715,586
[45] Feb. 6, 1973

[54] LIQUID SCINTILLATION SPECTROMETRY SYSTEM FOR SAMPLE ANALYSIS

[75] Inventors: Edward W. Thomas, Rockaway, N.J.; Edward Rapkin, Huntington, N.Y.

[73] Assignee: Intertechnique S. A., Paris, France

[22] Filed: Feb. 5, 1968

[21] Appl. No.: 703,153

[52] U.S. Cl. .......................... 250/71.5 R, 250/83.3 R
[51] Int. Cl. ................................................. G01t 1/20
[58] Field of Search ....... 250/83.3 R, 71.5 R, 106 SC, 250/207 R

[56] References Cited

UNITED STATES PATENTS

| | | | |
|---|---|---|---|
| 3,091,463 | 5/1963 | Cohen et al. | 250/71.5 |
| 3,101,409 | 8/1963 | Fite | 250/71.5 |
| 3,114,835 | 12/1963 | Packard | 250/83.3 |
| 3,320,419 | '5/1967 | Thomas et al. | 250/83.3 |
| 3,560,744 | 2/1971 | Jordan | 250/71.5 R |
| 3,004,167 | 10/1961 | Owen | 250/207 R |

Primary Examiner—James W. Lawrence
Assistant Examiner—Davis L. Willis
Attorney—Cameron, Kerkam and Sutton

[57] ABSTRACT

A liquid scintillation spectrometer system includes several discriminator channels and a single amplification chain consisting of several pre-adjusted linear amplifiers providing, for example, three pre-adjusted ranges in the gain ratios of 1, 10, 100. Thus 32P can be counted in a channel with a gain of 1 and tritium can be counted in a channel with a gain of 100. A range switch proceeds each pulse height analyzer permitting any isotope to be counted in any channel. In an alternative system, similar in principle, signals are taken from several dynodes of the photomultipliers, for example the ninth dynodes, the 11th dynodes and the 13th dynodes.

12 Claims, 6 Drawing Figures

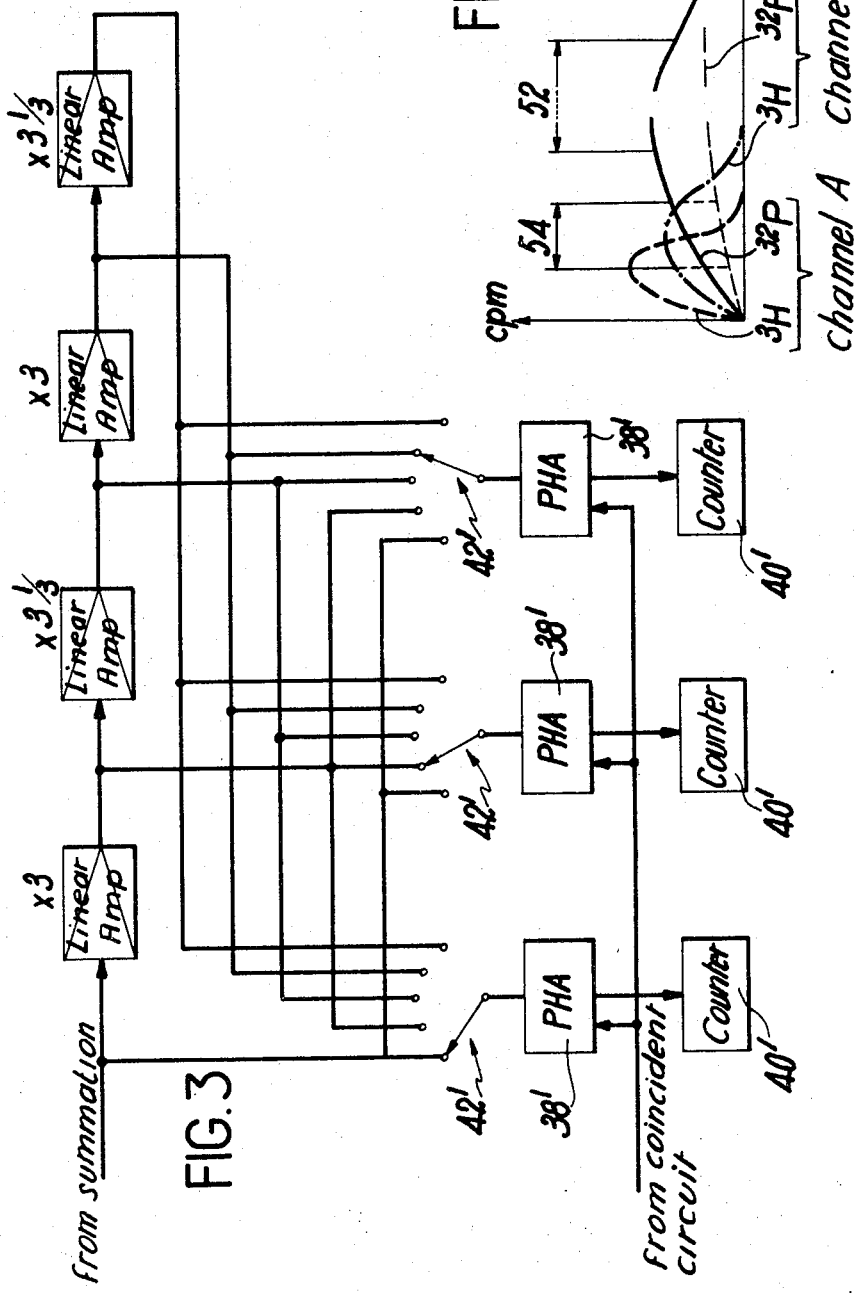

LIQUID SCINTILLATION SPECTROMETRY SYSTEM FOR SAMPLE ANALYSIS

The invention relates to scintillation spectrometry systems for measurement of β activity from radioisotopes present in a sample and more particularly in a liquid sample.

Liquid scintillation spectrometry is a technique which has gained wide acceptance due to its advantages over the previous methods: higher counting efficiency, low background and suitability to sort several β emitting isotopes contained in the same sample (plural label experiment) or in successive samples of a same group (mixed sample experiment).

Broadly defined, the liquid scintillation counting process makes use of the energy transfer from a β particle resulting from a radioactive decay event in the liquid solution to a scintillator dissolved in the solution: the scintillator (generally POP) emits light pulses which are absorbed by a second scintillator (POPOP or dimethyl POPOP) which re-emits light pulses at a longer wave length in the sensitivity range of one or preferably two photomultiplier tubes which view the sample. The solvent is generally an aromatic hydrocarbon and is contained in a vial of a glass having low activity.

The amount of light emitted by the sample responsive to each decay event is in direct proportion to the energy of the particle which products it; such light incident upon the photocathodes of the photomultipliers which view the sample results in electric pulses. The first liquid scintillation systems had a single photomultiplier for multiplying the light received from the sample. The output from the multiplier was amplified and fed to a single pulse height analyzer. Pulses falling within the desired range of analysis gave rise to corresponding pulses delivered by the pulse height analyzer to a scaler. The noise of the phototube made such a system unsatisfactory. In addition, it was not possible to count several isotopes during a same experiment: The first defect was cured by designing counters having two photomultipliers associated with a coincidence circuit, which rejected each pulse originating from one photomultiplier not matched with a pulse from the other phototube within the coincidence resolving time. The dual tube coincidence system, when used in a symmetrical system in which the output signals of the two phototubes are summed prior to pulse height analysis, has an ancillary advantage: the consequence of unbalance in light distribution between the two photomultipliers is minimized, with the result of better isotope separation in plural label experiments.

In order to simultaneously count several isotopes present in the same sample, multichannel systems were developed: the pulses from the phototubes were amplified linearly, and then applied to several channels each having a pulse height analyzer whose "window" corresponds to the isotope to be counted. Another problem occured, and had to be overcome. Sorting and counting the different isotopes exemplified in the following list

| Isotope | Maximum energy |
|---|---|
| $^3H$ | 18 keV |
| $^{14}C$ | 156 keV |
| $^{45}Ca$ | 260 keV |
| $^{32}P$ | 1,71 MeV | required a system with wide dynamic range. The light is converted into an electric pulse and amplified to a useful level by the photomultipliers and amplifiers; the amplified electric pulse should be substantially proportional to the energy of the β particle which produced it. The weakest detectable tritium β particle corresponds to about 1 keV whereas the energy range to the most energetic Phosphorus 32 β particle is from about 1 keV to 1.7 MeV imposing an overall dynamic range of 1,700 to 1. If $^3H$ and $^{32}P$ are to be counted simultaneously, the energy of tritium to be covered is from 1 keV to 8 keV and for, that part of the $^{32}P$ spectrum beyond tritium it is from 18 keV to 1.7 MeV.

In the early two-channel systems (with one linear amplifier) it was not possible to satisfactorily sort these two isotopes by energy. The two pulse height analyzers had the same range which was adjustable in terms of the energy range being examined by adjusting the high voltage supplied to the photomultiplier and hence its gain. If the range or gain was set satisfactorily for the tritium pulse height analyzer then the $^{32}P$ pulses were far too great in amplitude for the other analyzer. Conversely if the range was set satisfactorily for $^{32}P$ in one channel the tritium pulses were too small to be counted in the other channel. This problem was further compounded when more than two isotopes were counted either simultaneously in one sample (plural label) or non-simultaneously (mixed sample) but in an automatic system where it is undesirable to require the presence of an operator in order to change gain settings between measurements of the samples.

A first method was developed for overcoming this problem: it consisted in providing each pulse height analyzer with a linear amplifier of predetermined fixed gain and a variable attenuator for independent gain adjustment before each pulse height analyzer, thus permitting the range to be adjusted independently for each channel.

With a single control it is difficult to achieve reproducible adjustments when very energetic isotopes (such as $^{32}P$) are present and require high attenuation. Therefore several controls in series have been used.

For curing the above shortcomings, a system was developed which uses a single logarithmic pulse amplifier: the logarithmic system overcomes the problem of accepting broad dynamic ranges by taking the logarithm of the pulse before pulse height analysis, thus compressing the dynamic range to a manageable value. In this system no range adjustment is necessary after initial instrument calibration,, but it is difficult to make a logarithmic pulse amplifier without temperature instability of gain or zero shift with change in pulse rate.

A method has also been proposed which is somewhat along the same line as above: it consists in operating the photomultiplier tubes in such manner that the pulse amplitude spectrum is compressed in a nearly logarithmic form for a reasonably large dynamic range; this method has major disadvantages: First, it is not sufficiently logarithmic over a dynamic range wide enough to accept all isotopes, from $^3H$ to $^{32}P$; second, the compression is accomplished in the photomultipliers: summation of the signals in order to avoid statistical inequalities in signal distribution between the two tubes must be done after logarithmic compression and this does not cancel the unequal distribution as does summation done before taking the logarithm; third, taking all amplification gain from the phototubes requires that they operate at very high gain and exhibit more spurious noise; also, after a legitimate pulse there is a false "after pulse" whose value increases in direct relation with the high voltage at the anode; preferably, part of the gain may be obtained in the phototubes and part in an amplifier.

It is a general object of the invention to provide a new and improved scintillation spectrometer system.

It is another object of the invention to provide a liquid scintillation system which is free of the shortcomings of the prior art systems.

It is a more specific object of the invention to provide a liquid scintillation system which presents the advantages of the prior logarithmic systems while embodying only linear amplifiers and simple circuitry.

Other objects and advantages of the invention will appear from the following description of preferred embodiments, given as examples only. The description refers to the accompanying drawings in which:

FIG. 2 represents the pulse spectra for $^3H$ and $^{32}P$ in two analyzer channels of the spectrometer of FIG. 1;

Figure 1:
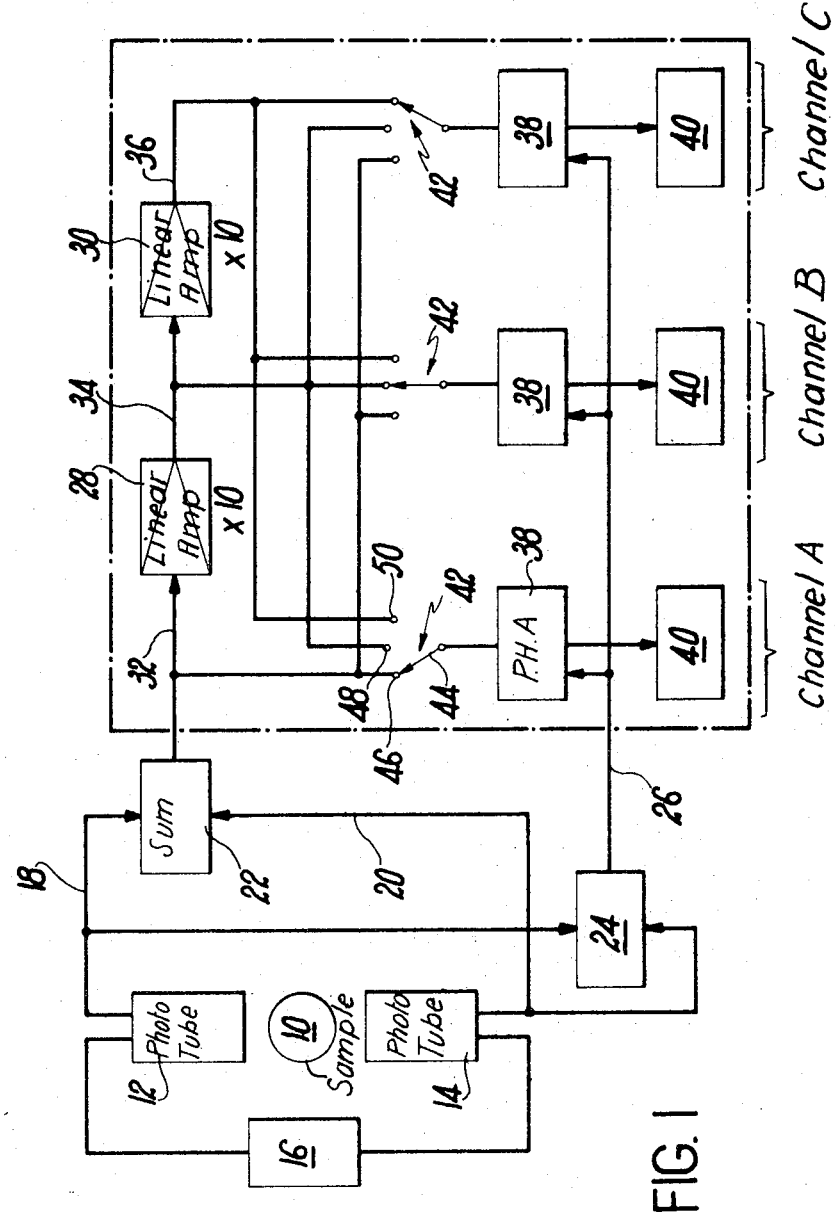
FIG. 1 is a block diagram of a symmetrical liquid scintillation spectrometer according to an embodiment of the invention.
Figure 4:
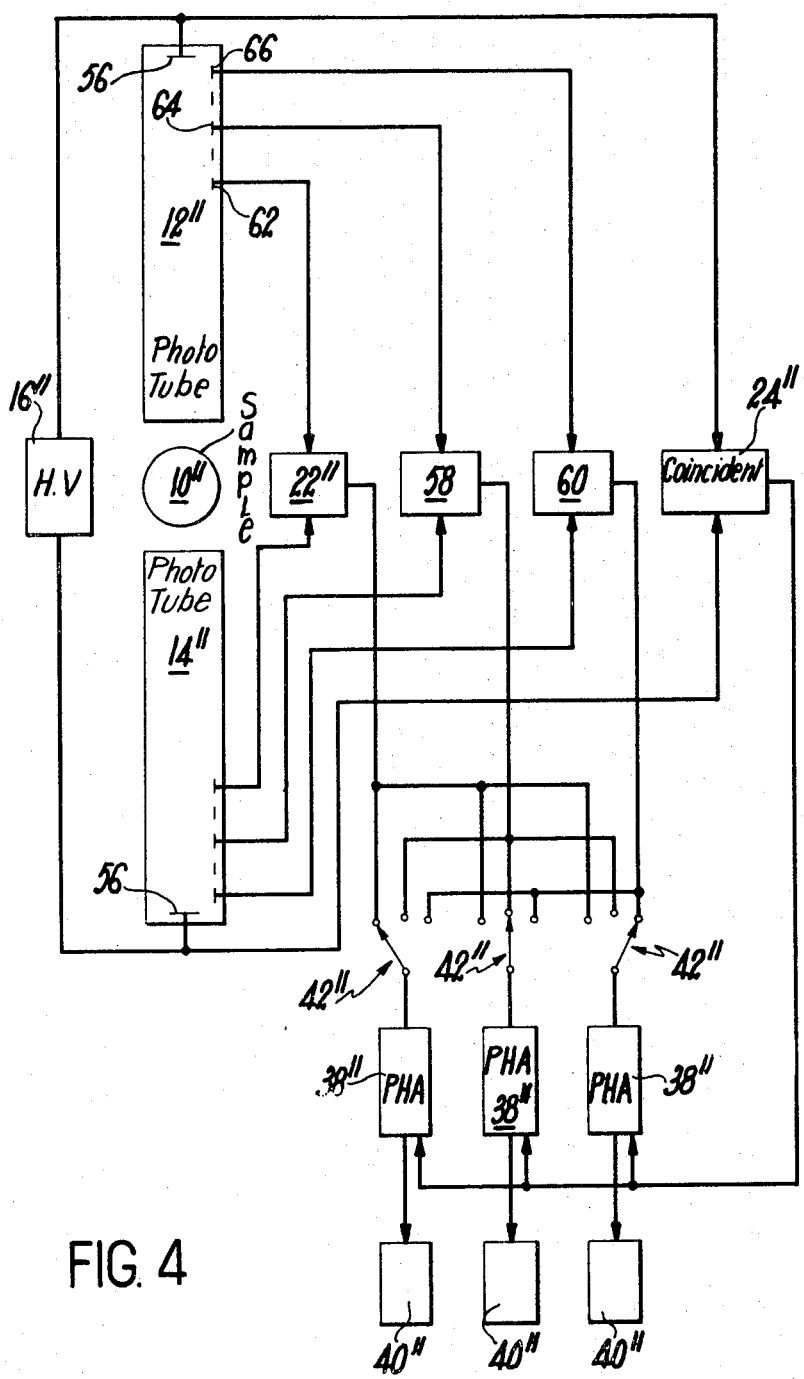
Figure 5:
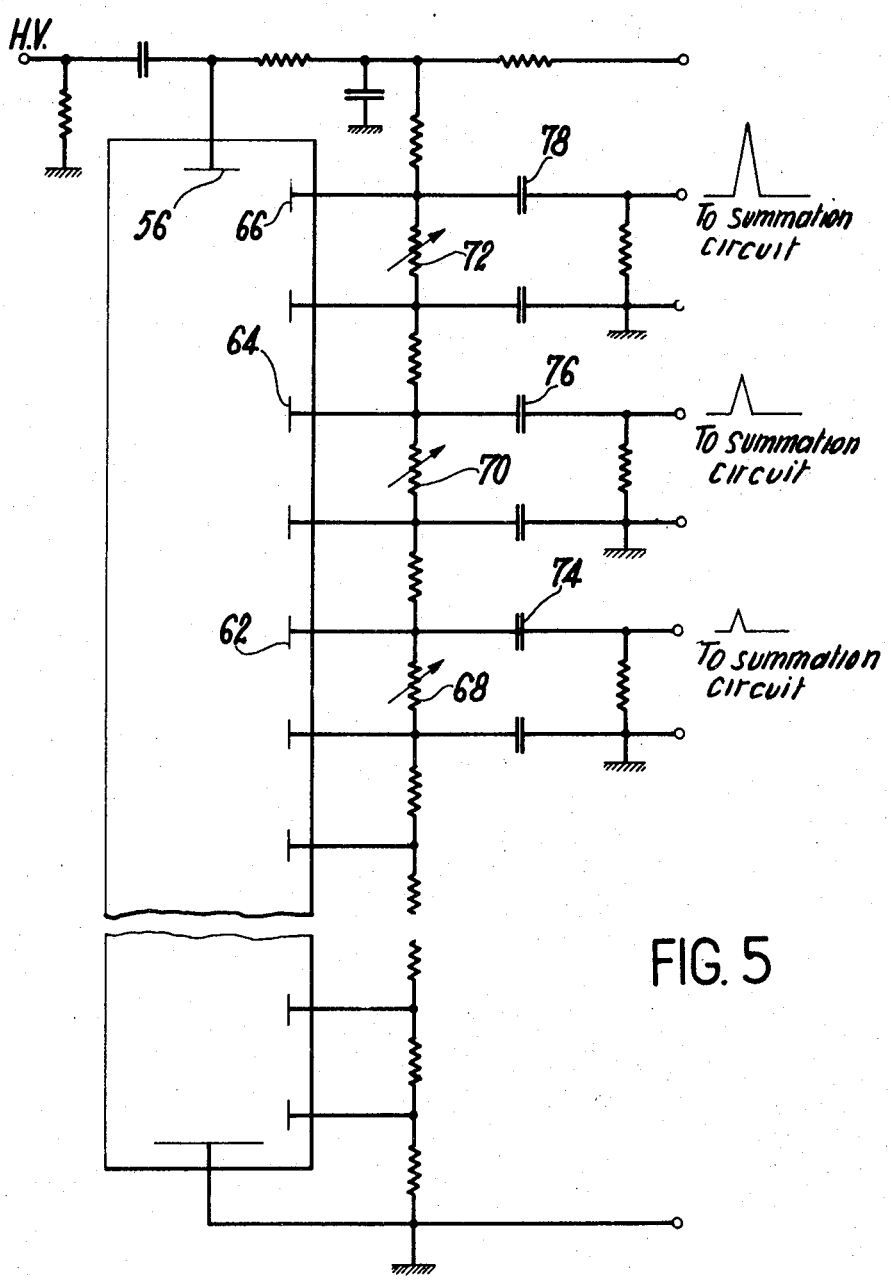
Figure 6:
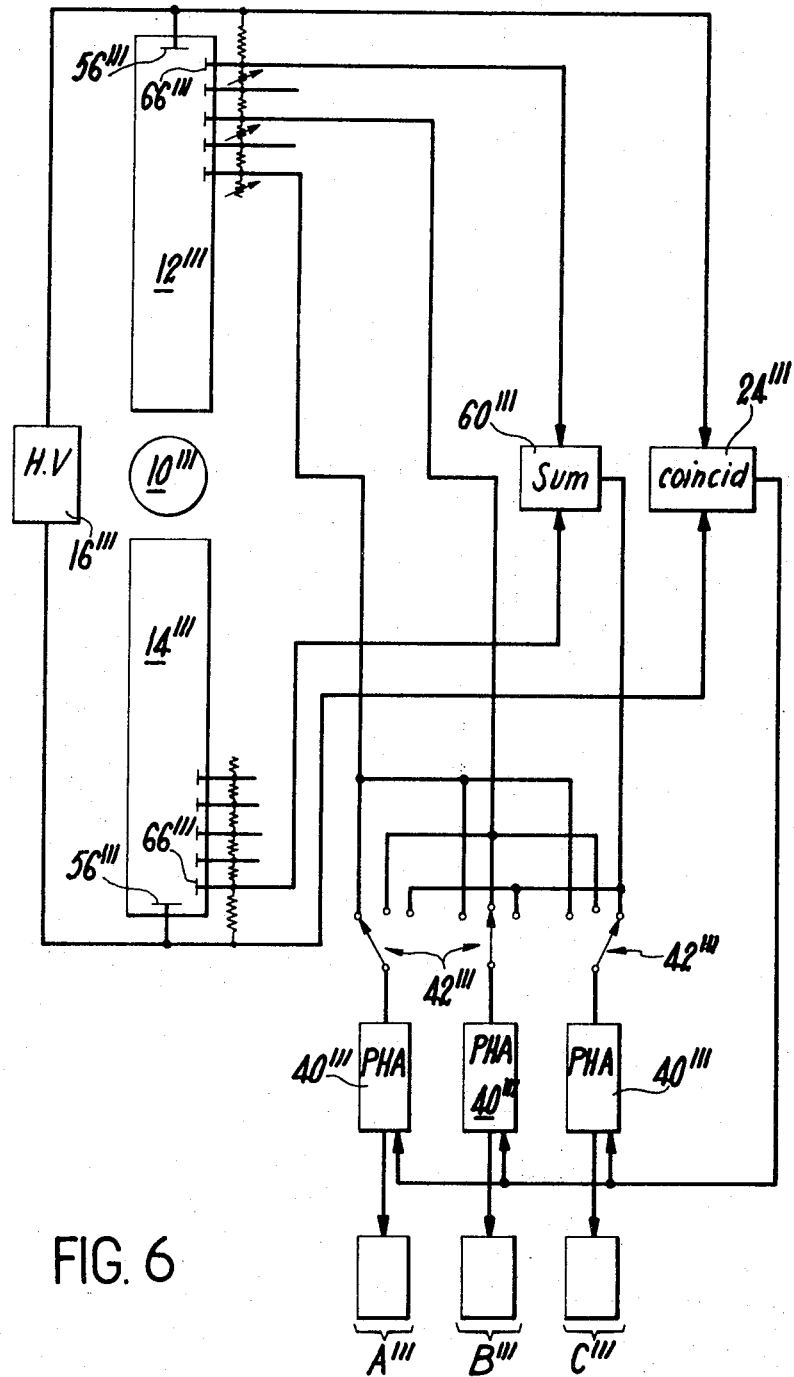

FIG. 3, similar to FIG. 1, illustrates a modified embodiment;

FIG. 4 is a block diagram of a symmetrical liquid scintillation spectrometer in which amplification takes place in the photomultiplier tubes only;

FIG. 5 is a schematic diagram of the electrical connections of a circuit associated with one of the photomultiplier tubes of FIG. 4;

FIG. 6, similar to FIG. 4 is a block diagram of an unsymmetrical liquid scintillation spectrometer constituting a modification of that shown in FIG. 4.

Referring first to FIG. 1 there is shown a liquid scintillation spectrometer to measure $\beta$ decay events in successive samples such as 10 located in successive links of a conveyor. Each sample consists of a transparent vial containing a solution of one or more $\beta$ emitting radioisotopes, such as $^3H$, $^{14}C$, $^{32}P$ $^{45}Ca$. The solution also contains a primary scintillator such as POP which absorbs energy of the $\beta$ decay events and emits light and a secondary scintillator such as POPOP which absorbs the primary scintillation and re-emits it at a longer wave length for which the photomultipliers are more sensitive.

As will be seen later the spectrometer is adapted to process plural label samples and/or mixed samples.

Two photomultiplier tubes 12 and 14 straddle the sample 10 for detecting the light pulses occuring in the sample. The phototubes 12 and 14 are of any conventional type currently used in the liquid scintillation technique, each having for instance 13 dynodes and an anode connected to an adjustable high voltage supply 16. The photomultiplier tubes and the sample are maintained during each measurement in a light tight chamber. Since a plurality of samples are to be counted in succession, the samples are moved into the chamber for measurement and then removed by an automatic conveyor and a transfer mechanism which may respectively be of the types described in French patent applications No. PV 100,705 and PV 100,706 filed in the name of the assignee of the present invention.

The light pulses received by the photomultiplier tubes 12 and 14 are converted into electrical pulses which are directed via electric lines 18 and 20 to a summation device 22 and to a coincidence circuit 24. The coincidence circuit 24 is conventional and includes a AND circuit adapted to provide an output signal to line 26 when it receives on its two inputs signals which are separated by a time delay shorter than its coincidence resolution time. It is of interest to note that in the modern counters the coincidence time is shorter than in instruments dating back to some years ago by a factor of more than 10.

According to the invention, the signal from summation device 22 is fed into a linear amplification chain consisting of several distinct amplification stages in series aiding relation: In the embodiment of FIG. 1, two separate amplifier stages 28 and 30 each providing an amplification gain of 10 are provided. As a result, three preadjusted amplification gains of 1, 10 and 100 are available: The input 32 of the first amplifier stage 28, the output 34 of the first amplifier stage 28 (which is also the input of the second stage) and the output 36 of the second amplifier stage 30 are each adapted to be connected to anyone of several analyzing channels. In the embodiment of FIG. 1, three channels A, B and C are provided so that three distinct isotopes may be sorted and counted in a group of samples without changing any setting. The number of three is of course in no way limitative. If most energetic isotopes (and more particularly $^{32}P$) are present, the large pulses of these isotopes overload the final amplifier: there could have been a problem some years ago when fast recovering amplifiers were not available. To-day amplifiers have been designed which accept the overload and recover within a fraction of a microsecond so that no substantial count loss takes place.

Each channel has a pulse height analyzer 38 of the "window" type associated with a AND gate and has a counting device 40. Each gate permits the signals representing the $\beta$ decay events to be transmitted to the counter only if it receives at the same time a signal from the coincidence circuit 24 by line 26: so only legitimate pulses due to decay events and that small fraction of the spurious noise signals due to the phototubes which are in coincidence are passed from the pulse height analyzers: any commercially available single channel analyzer in which the limits of the window may be adjusted may be used. The principal condition required from the counters are that they are adapted to accept the pulse rate expected from the more active samples to be counted and the pulse amplitude and polarity from the pulse height analyzer. The counters may be scalers, rate meters or be embodied in a data processing system of the type disclosed in French patent application No. PV 129,686 of the assignee of the present invention.

As seen on FIG. 1, the system comprises a number of selector switches 42 each associated with a channel and which enable the operator to connect the input of any channel to point 32, 34 or 36.

Each switch 42 has an arm 44 permanently connected to the input of the corresponding channel A, B or C and manually settable onto any one of three terminals 46, 48 and 50 electrically connected to points 32, 34 and 36, respectively: on FIG. 1, the switches 42 of channels A, B and C are respectively set so that they pass signals from the phototubes and summation device which have been amplified by a factor of 1, 10 and 100 respectively.

If now reference is made to FIG. 2, there are broadly shown the spectra of $^3$H seen with a scintillation counter with amplification gains of 1 (channel A) and 100 (channel C) and of $^{32}$P with the same amplification gains of 1 and 100. If the analyzer 38 of channel A is adjusted to that its window 52 is beyond the energy spectrum of $^3$H, $^{32}$P may be counted without cross-contribution due to $^3$H ; it may be counted at balance point according to techniques which are described in disclosures available to the public and need not be described here, although such technique is no longer necessary for obviating the effects of quenching since improved methods are available. $^3$H is counted in a different window 54 which preferably encompasses that part of the $^3$H spectrum curve which is comprised between a threshold limiting the energy range where the low energy "noise" of the PM renders the counting errors excessive and an upper value for which a notable fraction of the counts are due to $^{32}$P (or other isotopes as $^{14}$C, if such are present).

There is only a reason of convenience for choosing the gain ratios 1, 10 and 100 in the system of FIG. 1 : With these ratios channel A utilizing the lowest gain could cover for instance an equivalent energy range of from 0 to 2.5 MeV ; channel B using the medium gain would cover an equivalent range of from 0 to 250 keV ; and channel C using the highest gain would cover a range of from 0 to 25 keV. All of the commonly counted isotopes can be satisfactoryly accommodated in one of these ranges.

If however more flexibility in range is required more amplifier stages of lower individual gain could be used as illustrated in block diagram in FIG. 3.

For more clarity, parts of the embodiment of FIG. 3 corresponding to those in FIG. 1 carry the same reference with a prime mark affixed thereto. The four successive amplifier stages are set to 3, 3⅓, 3 and 3⅓ respectively, thereby providing available energy ranges which may be 0 - 3 MeV (prior to amplification), 0 - 1 MeV, 0 - 300 keV, 0 - 100 keV and 0 - 30 keV (maximum amplification gain) for example.

Of course more amplifier stages may also be provided for extending the available energy range, although a ratio of 1 to 100 between the upper limits of the lowest energy range and of the highest energy range is generally sufficient.

Either proposed method could be used equally well in a single photomultiplier tube liquid scintillation counter or in a two tube non-symetrical system.

In the embodiment of FIG. 4 there are no amplifiers provided in addition to the phototubes : Signals are taken from several dynodes of the two photomultiplier tube 12", 14" which have 13 dynodes each ; an adjustable high voltage supply 16" is connected to the anode 56 of the phototubes. Corresponding pairs of signals are summed in summation circuits 22", 58, 60 in the same way as in the embodiments of FIG. 1 and 3 to improve the statistical distribution. Since the amplification gains should be the same at corresponding dynodes of both tubes and be properly stepped, adjustable means should be provided. As shown on FIG. 5, each of the ninth, eleventh or thirteenth dynodes 62, 64, 66 is provided with an adjustable resistor 68, 70 or 72 connecting it to the preceeding dynode. Isolation between the dynodes may be had by locating capacitors 74, 76, 78 on the output lines from the dynodes to the corresponding summation circuits.

Of course, phototubes with a different number of dynodes may be used and the dynodes from which the signals are taken are not necessarily separated by another dynode. They can be separated by more than one dynode or not at all.

Of course, the systems of FIG. 1, 3 and 4 may be used with a single photomultiplier tubes or with two phototubes but without summation that is in a non-symmetrical system having no summation but a coincident circuit between the two phototubes. As noted above, summation is used for compensating the unbalance between two tubes when a statistically small number of photons is available from each radioactive decay event (for $^3$H for instance an average energy $^3$H decay event provides less than 40 photons). When the energy pulses are very large (with $^{32}$P for instance) there are hundreds of electrons produced in each tube and the numbers in the phototubes are close together statistically. A summation circuit is not necessary in this case. As a consequence, the embodiment of FIG. 4-5 may be modified as indicated on FIG. 6 : In the embodiment of FIG. 6 the two 13th dynodes 66''' are associated with a summation circuit 60''' while the outputs of the lower gain dynodes 62''', 64''' of one of the photomultiplier tubes 12''' are connected directly to the selector switches 42''' of the the discriminator channels A''', B''', C''' : the coincident circuit 24''' remains connected to the anodes 56''' of both phototubes and controls the input gates to the pulse analyzers.

Although only certain selected embodiments of the invention have been chosen for purposes of illustration, it will be understood that these are in no way restrictive of the invention. It is reasonably to be expected that those skilled in the art can make variations and revisions of the invention as will incorporate the herein disclosed principles, and it is intended that such revisions and variations as incorporate the herein disclosed principles will be included within the scope of the following claims as equivalents of the invention.

We claim :

1. A spectrometer system for measuring the energy of decay events of $n$ different radioisotopes having different energy spectra and contained in samples, comprising :

detector means responsive to decay events occuring in a sample for producing electrical pulses whose amplitude is in direct relation with the energy of the originating beta decay events, means for amplifying said electrical pulses comprising a plurality of linear amplification stages in series aiding relation each providing a predetermined amplification gain, and at least $n$ counting channels each having :

counting means, pulse height discriminator means for passing only a selected amplitude band of said electrical pulses to said counting means, and operator controlled selector means for connecting the input of said pulse height discriminator to one selected of said amplification stages.

2. A liquid scintillation counting system for measuring the energy of beta decay events of $n$ different radioisotopes having different energy spectra and contained in liquid samples which also contain scintillator means which convert the energies of beta decay events in a sample into light energy pulses, comprising :
   detector means responsive to said light energy pulses for producing electrical pulses whose amplitudes are in direct relation with the energies of the originating beta decay events,
   amplifier means comprising a plurality of linear amplification stages in series aiding relation, each providing a predetermined amplification gain, and
   at least $n$ counting channels each having :
      counting means,
      pulse height analyzing means for passing only a selected amplitude band of pulses to said counting means, and
      operator controlled selector means for connecting the input of said pulse height analyzing means to the output of one selected of said amplification stages.

3. A symmetrical liquid scintillation system according to claim 2, wherein said detector means comprise a plurality of photo multiplier tubes, said system additionally including means for summing the electrical pulses from said phototubes prior to amplification thereof and means in each of said counting channels for coincidence gating the pulses received from said plurality of phototubes prior to counting them.

4. A liquid scintillation counting system for measuring the energy of beta decay events of $n$ different radioisotopes having different energy spectra and contained in liquid samples which also contain scintillator means which convert the energies of beta decay events in a sample into light energy pulses, comprising
   detector means responsive to said light energy pulses for producing electrical pulses whose amplitudes are in direct relation with the energies of the orginating beta decay events,
   amplifier means comprising a plurality of linear amplification stages in series aiding relation, each providing a predetermined amplification gain, and
   at least $n$ counting channels each having:
      counting means,
      pulse height analyzing means for passing only a selected amplitude band of pulses to said counting means, and
      operator controlled selector means for connecting the input of said pulse height analyzing means to the output of one selected of said amplification stages, wherein said detector means and amplifier means consist in a plurality Of identical photomultiplier tubes each having a plurality of dynodes corresponding to increasing amplification gains and wherein said selector means are constructed to connect the input of said pulse height analyzer to a selected one of several summation circuit each of which is fed by corresponding predetermined dynodes of said phototubes.

5. A liquid scintillation system according to claim 4 having adjustment means for adjusting the amplification gain at each of said predetermined dynodes.

6. A symmetrical spectrometer system for measuring the energy of beta decay events of $n$ different radioisotopes having different energy spectra and contained in liquid samples, comprising
   at least two detectors responsive to beta decay events occuring in a sample for producing electrical pulses whose amplitude is in direct relation with the energy of the originating beton decay event,
   means for summing said electrical pulse signals from said detectors,
   a coincident circuit providing an output on occurence of pulses from all said detectors during a predetermined time delay,
   means for amplifying the signal from said detectors, comprising a plurality of linear amplification stages in series aiding relation each providing a predetermined adjustable amplification gain, and
   at least $n$ counting channels each having ;
      counting means,
      a pulse heigh analyzer for delivering a pulse responsive to each input pulse falling in a preselected amplitude band to said counting means,
      gating means operative when energized by said coincidence circuits, and
      operator controlled selector means for connecting the input of said pulse height analyzer to the output of any one of said amplification stage.

7. A spectrometer system according to claim 6 wherein the amplifier means provide extreme amplification gains which are in a 100/1 ratio.

8. A spectrometer system according to claim 6, wherein the amplifier means comprise two stages each providing a gain of 10.

9. A spectrometer system according to claim 6, wherein the amplifier means comprise successive stages providing gains of 3 and 3 ⅓ in alternance.

10. A liquid scintillation counting system for sorting $n$ different isotopes having different $\beta$ decay energy spectra and contained in liquid samples which also contain scintillator means which convert the energies of said $\beta$ particles into light energy pulses comprising :
   at least one photomultiplier tube responsive to said light energy pulses for producing electrical pulses each of said photomultiplier tubes having:
      a plurality of dynodes,
      means for adjusting the amplification gain between a plurality of successive dynodes;
   at least $n$ counting channels each having :
      counting means,
      pulse height discriminator means for passing only a preselected amplitude band of pulses to said counting means, and
      an operator controlled selector switch for connecting the input of said pulse height analyzer to one selected of said plurality of dynodes.

11. A liquid scintillation counting system according to claim 10, having at least two identical photomultiplier tubes, a coincidence circuit operatively associated with the anodes of said photomultiplier tubes, means for adjusting the gains at corresponding dynodes of the said phototubes to the same value, summation means for summing the pulses from at least a pair of corresponding dynodes of said photomultiplier tubes which correspond to the higher amplification gains, said selector switches being constructed for connecting the inputs of said pulse height analyzers either to said pair of dynodes across said summation means or direct to another dynode of one phototube providing a gain lower than that of said pair of dynodes.

12. A liquid scintillation system according to claim 10, wherein said adjusting means comprise variable resistors connecting successive dynodes.

* * * * *